United States Patent
Kerr, Jr.

(10) Patent No.: US 6,503,099 B2
(45) Date of Patent: Jan. 7, 2003

(54) QUICK CONNECT DEVICE FOR ELECTRICAL FIXTURE

(75) Inventor: Jack Russell Kerr, Jr., College Station, TX (US)

(73) Assignee: Angelo Fan Brace Licensing LLC, Philadelphia, PA (US)

( * ) Notice: Subject to any disclaimer, the term of this patent is extended or adjusted under 35 U.S.C. 154(b) by 0 days.

(21) Appl. No.: 10/156,919

(22) Filed: May 28, 2002

(65) Prior Publication Data

US 2002/0182917 A1 Dec. 5, 2002

Related U.S. Application Data

(60) Provisional application No. 60/295,186, filed on Jun. 1, 2001.

(51) Int. Cl.[7] .............................................. H01R 13/62
(52) U.S. Cl. ...................... 439/537; 439/140; 439/316; 439/333
(58) Field of Search ................................ 439/537, 140, 439/316, 333, 313, 314, 318

(56) References Cited

U.S. PATENT DOCUMENTS

| 3,798,584 | A | * | 3/1974 | Person .......................... 174/62 |
| 3,894,781 | A | * | 7/1975 | Donato .......................... 439/121 |
| 4,645,286 | A | * | 2/1987 | Isban et al. ................... 439/450 |
| 4,645,289 | A | * | 2/1987 | Isban .......................... 439/101 |
| 4,721,480 | A | * | 1/1988 | Yung .............................. 416/5 |
| 4,929,187 | A | * | 5/1990 | Hudson et al. ............. 439/334 |
| 5,403,198 | A | * | 4/1995 | Koganemaru et al. ...... 439/333 |
| 5,714,963 | A | * | 2/1998 | Cox ........................... 343/772 |
| 6,146,191 | A | * | 11/2000 | Kerr et al. ................. 439/140 |

* cited by examiner

Primary Examiner—Tulsidas Patel
(74) Attorney, Agent, or Firm—Drinker Biddle & Reath LLP

(57) ABSTRACT

A ceiling fan or light fixture is provided with a sliding support member that slides horizontally into a support channel attached to a ceiling box. An electrical plug and receptacle attached to the two support members automatically mate as the two support members are slid together. A bell is then raised to cover the two support members and prevent them from sliding apart.

15 Claims, 5 Drawing Sheets

QUICK CONNECT DEVICE FOR ELECTRICAL FIXTURE

CROSS-REFERENCE TO RELATED APPLICATIONS

This application claims benefit of U.S. provisional patent application No. 60/295,186, filed Jun. 1, 2001, which is herein incorporated in its entirety.

FIELD OF THE INVENTION

The field of the invention is electrical fixtures, and especially the overhead mounting of lighting fixtures, fans, and the like.

BACKGROUND OF THE INVENTION

The installation of a conventional ceiling fan or pendant ceiling lamp is a difficult task for a single installer. To install a conventional ceiling fan, the fan is lifted to just below an electrical junction box set into the ceiling, and is held there while connecting the fan wires to the electrical supply wires. After the electrical connection is finished, the fan is lifted further to place the fan bell over the junction box and held in that position while the fan is attached to the box or a ceiling hanger in some manner, typically with screws or bolts. The combined operation takes several minutes and usually requires two persons, one to lift and hold the fan and the other to make the wire and screw connections.

SUMMARY OF THE INVENTION

The current invention is a quick connect device for hanging fans, lighting fixtures, and the like. A horizontal sliding connector is provided between the ceiling box and the electrical fixture. The sliding connector takes the weight of the fixture as it is inserted, which can be done by one person. The electrical connections are established by a plug-and-receptacle connector positioned to engage automatically as the sliding connector slides into place. The fan bell or canopy is then raised into position, covering and securing the sliding connector. Thus, the installer never needs to support the weight of the ceiling fixture while working on screw or wire connections.

One aspect of the invention provides a quick connect device for suspended electrical devices, comprising first and second support members. The first support member defines a channel, and has within it a first electrical connector. The second support member is dimensioned to slide along and be guided by the channel into a position mating with the first support member, and bears a second electrical connector. The first and second connectors are so positioned as to mate when the second support member is slid into mating position. One of the support members is adapted to be attached to and supported by an electrical ceiling box, and the other support member is adapted to be attached to and support an electrical device.

Another aspect of the invention provides a ceiling mountable electrical device. A first mounting member is adapted to be attached to and to project from a ceiling. A second mounting member is attached to the device. One of the first and second members defines a channel into which the other can slide. The mounting members are arranged to mate by horizontal sliding movement of the device and the second mounting member when the first mounting member is attached to a ceiling. First and second electrical connectors are provided on the first and second mounting members. The first electrical connector is adapted to be connected to an electrical supply in the ceiling and the second electrical connector is electrically connected to the device. The electrical connectors are positioned to be in the channel and to mate when the first and second mounting members mate. The device can be electrically and mechanically attached to the ceiling by a single horizontal sliding movement.

As can be seen from the description and Figures contained herein, hanging a fan or lighting fixture, particularly a heavy one, can be rendered a simple task using the quick connect device of this application.

BRIEF DESCRIPTION OF THE DRAWINGS

For purposes of illustrating the invention, the drawings show one or more forms in which the invention can be embodied. The invention is not, however, limited to the precise forms shown unless such limitation is expressly made in a claim. In the drawings:

DETAILED DESCRIPTION OF THE DRAWINGS

Figure 1:
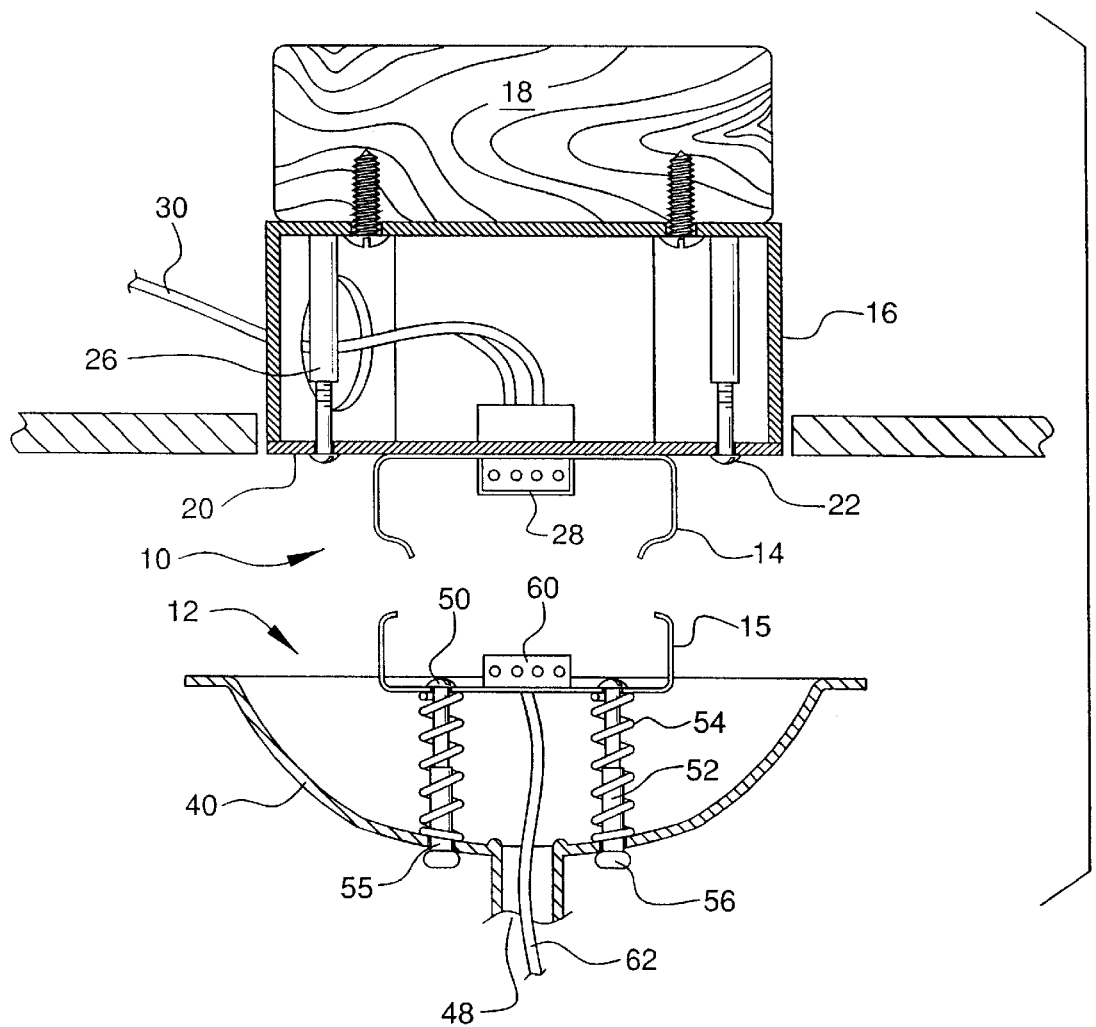
FIG. 1 is a schematic end elevation view of one embodiment of the quick connect device.
Figure 2:
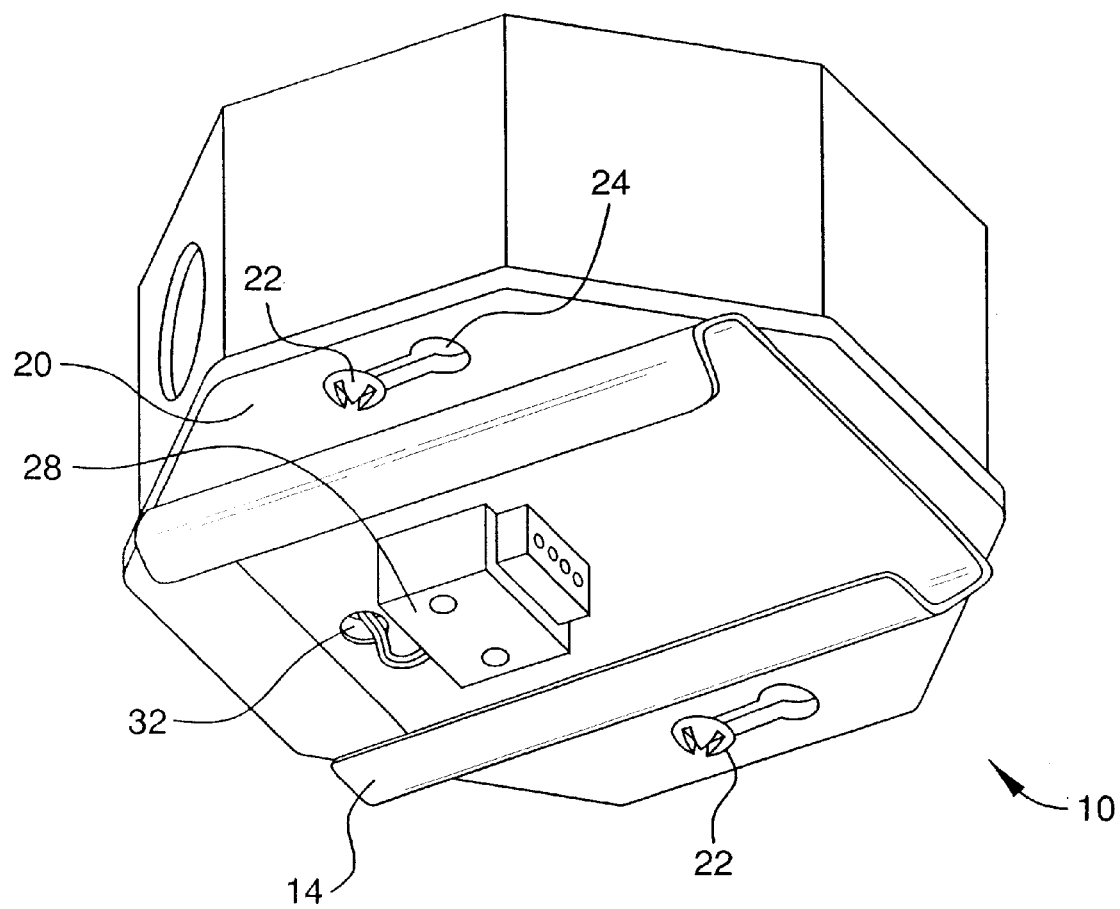
FIG. 2 is a perspective view from below of an upper part of the quick connect device shown in FIG. 1.
Figure 3:
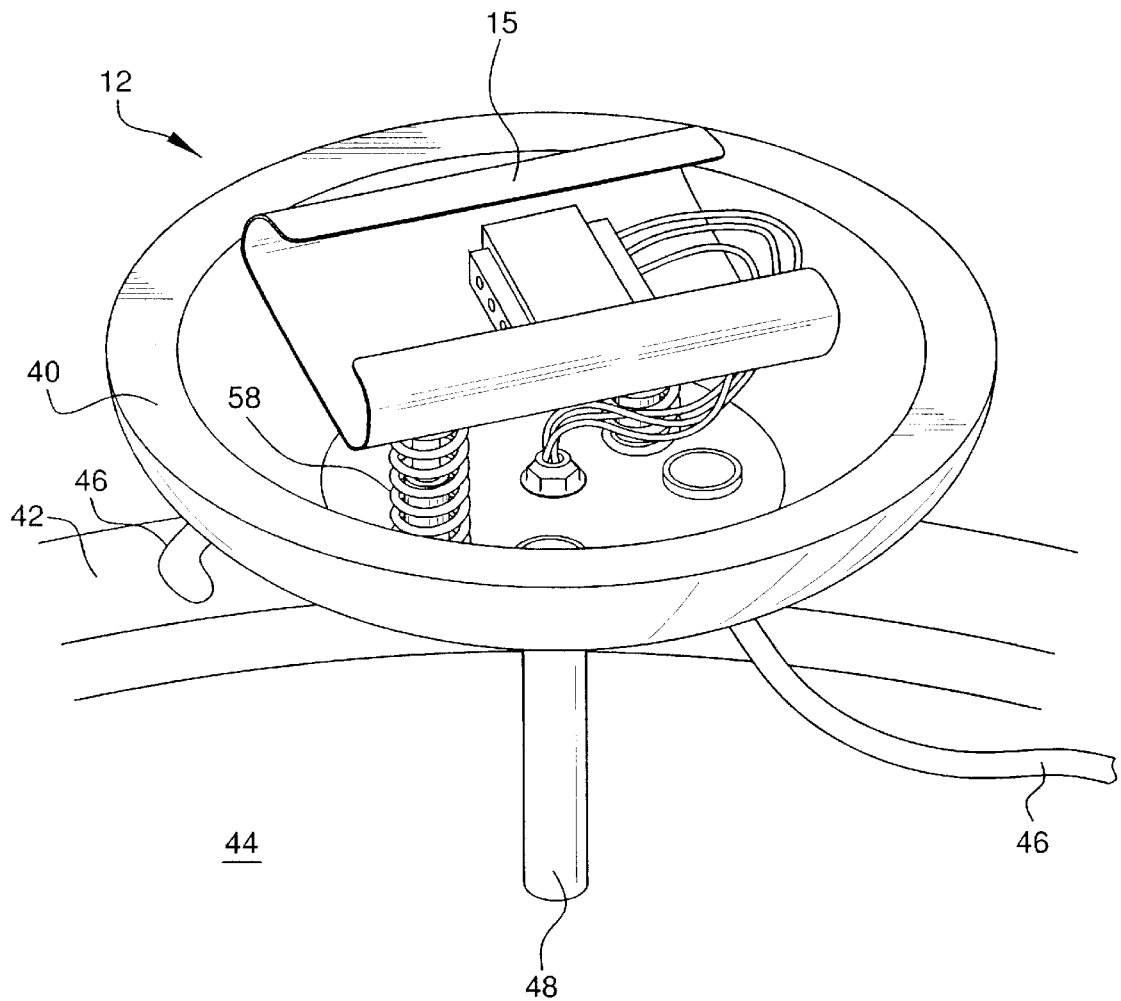
FIG. 3 is a perspective view from above of a lower part of the quick connect device shown in FIG. 1.

Referring to FIGS. 1 to 3 of the drawings, one form of quick connect device according to the invention comprises a mounting assembly indicated generally by the reference numeral 10 and a hanging assembly indicated generally by the reference numeral 12. The mounting assembly 10 of the quick connect device comprises a first support member in the form of a mounting slide 14, and the hanging assembly 12 of the quick connect device comprises a second support member in the form of a hanging slide 15. The slides 14 and 15 are shown as being bent from sheet metal, in C-shaped cross sections, with the mounting slide 14 defining a channel open downwards and the hanging slide 15 open upwards. The slides 14 and 15 are shaped and dimensioned so that the hanging slide 15 will slide into and along the channel of the mounting slide 14, fitting snugly but without binding.

The mounting slide 14 is shown attached to an electrical box 16, which is in turn attached to a ceiling joist 18. As shown in FIG. 2, the mounting slide 14 is fixed to a cover plate 20 that is dimensioned to cover the open underside of the electrical box 16. The cover plate 20 is then screwed to the ceiling box 16, for example, by screws 22 that pass through holes or keyhole slots 24 in the cover plate 20 and screw into internally threaded posts 26 that are provided in standard load-bearing ceiling boxes. Alternatively, the mounting slide 14 may be mounted directly onto the ceiling box 16.

An electrical connector 28, which will be discussed further below, is mounted within the mounting slide 14. The electrical connector 28 is connected to wiring 30 that supplies power to the electrical box 16 from within the building. The wiring 30 may be connected to the connector 28 (or to stub wires extending from the connector 28) within the electrical box 16 before the cover plate 20 is screwed into place. Alternatively, the wiring 30 may be led through a hole 32 in the mounting slide 14 and connected to the connector 28 within the channel of the mounting slide 14. The mounting assembly of the quick connect device will normally be completely connected to the ceiling, both electrically and mechanically, before the electrical fixture that is to be attached to the ceiling is involved.

Referring now especially to FIG. 3, the hanging slide 15 is attached to a bell 40, to which a ceiling lamp or other appliance 42 is attached. As shown in FIG. 3, the appliance 42 is a light fixture, with a bowl 44 attached to the bell 40 by three arms 46, and a central shaft 48 supporting a central lamp unit (not shown). Instead, the appliance 42 may be a lamp or fan suspended solely from the central shaft 48, in which case a ball mounting (not shown) may be provided between the bell 40 and the shaft 48. Various forms of appliance, and various means of attaching an appliance to a bell, are well known in the art and may be substituted for the specific examples shown and described.

The hanging slide 15 is attached to the bell 40 by screws 50 threaded into sleeves 52. The screws 50 extend downwards from the hanging slide 15, to which they are keyed or fixed, in any convenient manner, to prevent them from rotating. For example, the screws 50 may be coach-bolts set into square holes 54 in the hanging slide 15. The lower ends of the sleeves 52 project through holes 55 in the bell 40, and are provided with enlarged heads 56, by means of which they may be rotated manually. Coil springs 58 are positioned round the screws 50 and sleeves 52. The coil springs 58 are in compression, and ensure that the heads of the screws 50 remain in engagement with the hanging slide 15 and the heads 56 remain in engagement with the bell 40. With the screw connection between the screws 50 and the sleeves 52 fully extended, as shown in FIG. 1, the hanging slide 15 is above the rim of the bell 40. With the screws 50 fully screwed into the sleeves 52, the hanging slide is drawn at least fully into the bell 40, and possibly further.

An electrical connector 60 is positioned within the hanging slide 15. Wires 62 from the connector 60 lead down, for example, through the interior of the shaft 48, to the electrically powered or controlled parts of the appliance 42. The respective connectors 28 and 60 form the two halves of a plug-and-receptacle connection, and are so positioned within their respective slides 14, 15 that as the hanging slide is slid into the mounting slide the connectors are brought together to form a proper electrical connection between plug and receptacle. Because the appliance 42 may be mounted or dismounted, by means of the quick-connect mounting, without the power supply to the ceiling box being shut off, it is preferred that the upper connector 28 be the receptacle, unless it is a shrouded or shielded plug.

The hanging assembly 12 of the quick connect device may be assembled to the bell 40 by the fixture manufacturer or, if the bell has suitable fitting holes 55, may be assembled by the installer. However, even if it is assembled on site, that assembly can be completed with the fixture 42 supported on the floor or a table or bench. The screws 50 and sleeves 52 are set so that the hanging slide 15 is securely connected to the bell 40, but is above the rim of the bell.

The fixture 42, with the hanging assembly 12 of the quick connect device, is raised by hand until the hanging slide 15 is lined up so that it slidably engages the mounting slide 14.

The channels 14, 15 must be aligned so that the plug 60 will engage the receptacle 28. Stops (not shown) may be provided to prevent the wrong ends of the mounting slides 14, 15 from being slid together. Once the plug 60 and receptacle 28 are properly engaged, electrical current can pass through the plug/receptacle connection from the wires 30 in the electrical box 16 to the wires 62 in the fixture. The fully-engaged position of the plug and receptacle 60, 28 determines the alignment of the bell 40 and the fixture 42, correctly centered below the ceiling box 16.

Once the plug 60 and receptacle 28 are engaged, the bell 40 is supported by the mounting slides 14, 15, but is still below the normal plane of the ceiling as shown in FIG. 1: electrical boxes 16 are usually installed so that the face plate 20 is flush with the ceiling. Tightening the sleeves 52 by turning their heads or mounting knobs 56 raises the bell 40. The bell 40 is raised until its rim is in contact with the ceiling. This allows the final position of the bell to be adjusted to accommodate a difference in height or angle between the face plate 20 and the ceiling.

Once the light fixture is flush to the ceiling, final connections, if not already made, can be performed within the fixture 42. Rough installation of the fixture 42 is then complete.

Figure 4:
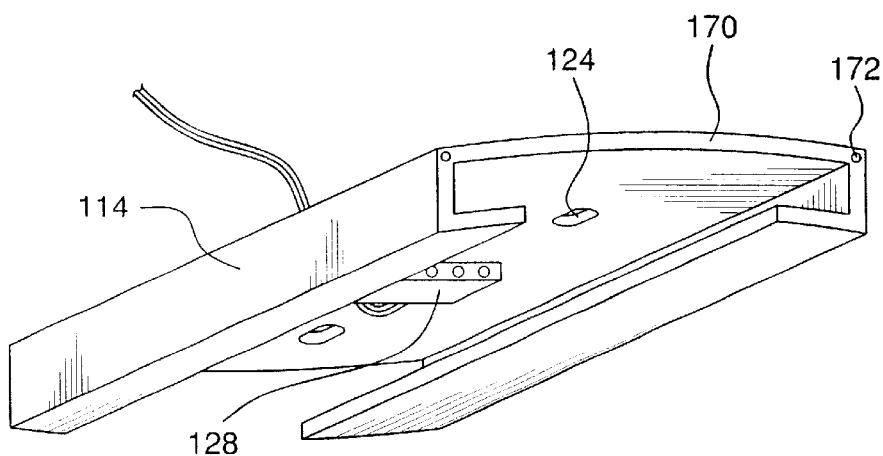
FIG. 4 is a perspective view from below of an upper part of a second embodiment of the quick connect device.
Figure 5:
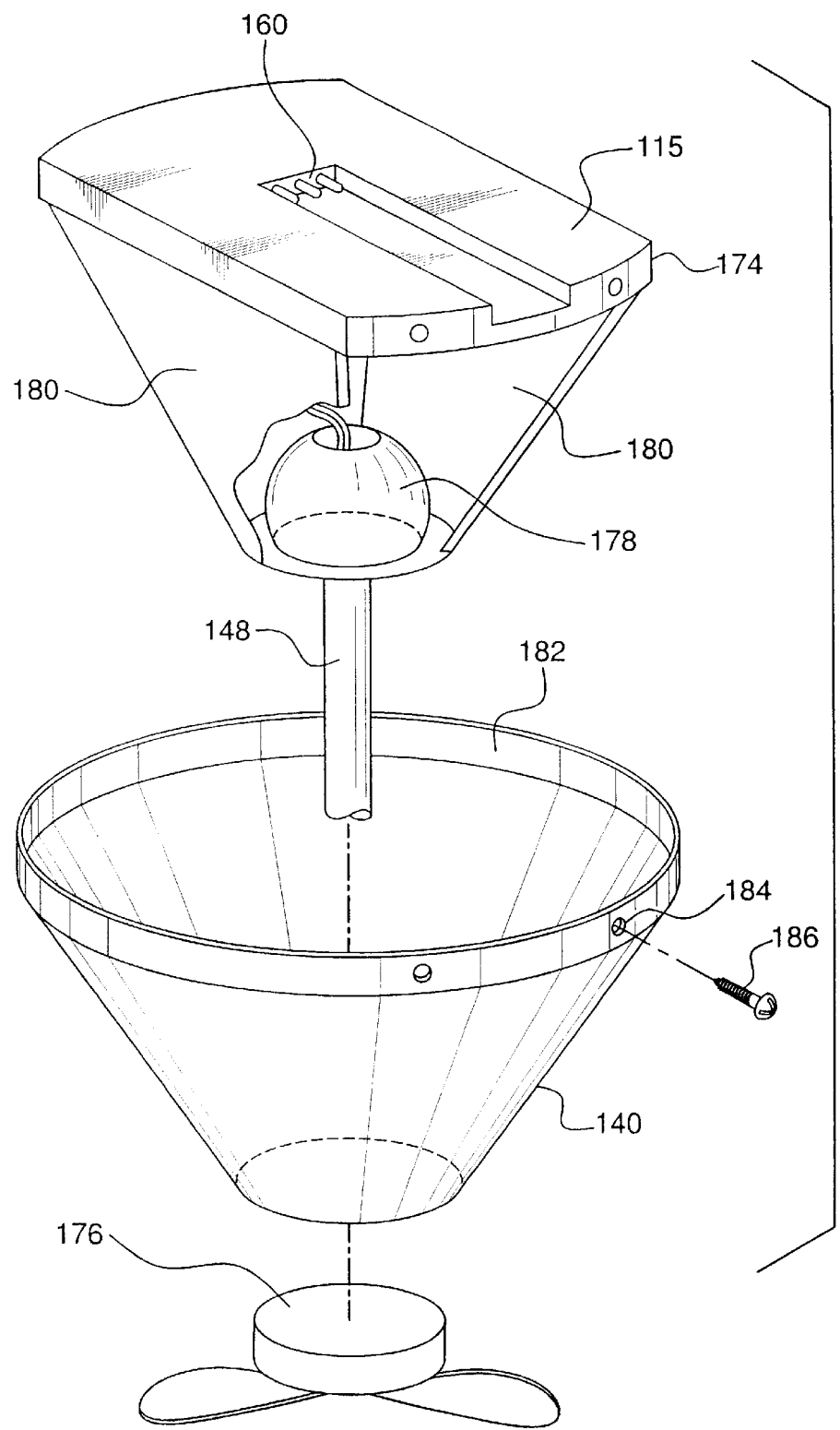
FIG. 5 is a perspective view from above of a lower part of the quick connect device shown in FIG. 4.

Referring now to FIGS. 4 and 5, in which features corresponding to those of FIGS. 1 to 3 are assigned reference numerals greater by 100 than those used in FIGS. 1 to 3, a second embodiment of the quick connect device comprises a mounting slide 114, formed from extruded or cast plastic material, in a C-section, defining an interior channel with the open side downwards. The mounting slide 114 is provided with slots or holes 124, by means of which it may be screwed to an electrical ceiling box 16 or a cover plate 20 as shown in FIGS. 1 and 2. In the interior channel of the mounting slide 114 is an electrical connector 128, similar to the electrical connector 28 shown in FIGS. 1 and 2.

The end faces 170 of the mounting slide 114 are curved into arcs centered on a common vertical axis in the middle of the mounting slide 114. Each end face 170 is provided with one or more bores 172, extending radially or axially into the material of the mounting slide 114. The bores 172 may be threaded, if the material of which the mounting slide 114 is made is not suitable for a self-tapping screw to bite.

The hanging assembly of the second embodiment of quick-connect device comprises a hanging slide 115, which is of generally rectangular section and has curved end faces 174. The hanging slide 115 is dimensioned to slide snugly, but without binding, inside the mounting slide 114. When the hanging slide 115 is fully inserted, the curved end faces 174 lie on the same arcs as the end faces 170 of the mounting slide 114. The hanging slide 115 carries a ceiling fan 176 on the end of a downshaft 148, which is supported by a ball mounting 178 on brackets 180 from the hanging slide 115. In the interests of simplicity, the hanging slide 115 is shown as a solid block of material, with only as much cut away as is needed to clear the receptacle 128. However, it will be appreciated that significant additional parts may be omitted to save material, to assist in installing or connecting the plug 160, to simplify manufacture, or for other reasons.

A bell or canopy 140 is disposed around the downshaft 148. The bell 140 has a cylindrical rim 182, with an inside diameter slightly greater than the arcs on which the end faces 170 and 174 lie. The rim 182 is formed with a number of holes 184, the location and purpose of which are explained below.

To install the fan 176, the mounting slide 114 is first connected electrically and mechanically to a ceiling electrical box 16, substantially as described above with reference to FIGS. 1 to 3. The fan 176 and bell 140 are also assembled to the hanging slide 115, if that has not already been done. The bell 140 is left loose over the downshaft 148. The installer then raises the fan assembly to the ceiling, and inserts the hanging slide 115 into the mounting slide 114. The installer then slides the hanging slide 115 along the mounting slide 114 until the plug 160 engages the receptacle 128. The plug 160 and receptacle 128 are so positioned that they will automatically engage as the hanging slide 115 slides along the mounting slide 114, and that when they are fully engaged the end faces 170 and 174 of the hanging slide and the mounting slide will be flush at both ends.

The fan is then supported by the hanging slide 115 and the mounting slide 114, and the installer may release it. The installer then raises the bell 140. The rim 182 of the bell 140 fits over the end faces 170 and 174 of the hanging slide 115 and the mounting slide 114, and can be rotated so that at least one of the holes 184 in the rim aligns with a bore 172 in the support channel. A screw 186 is then inserted into at least one hole 184 and bore 172. Preferably, at least two screws 186 are inserted on opposite sides of the quick connect device, for both esthetic and structural reasons. However, because the only function of the screws is to support the weight of the bell 140, which is not load-bearing, they need not be large or numerous.

Figures 6, 7:
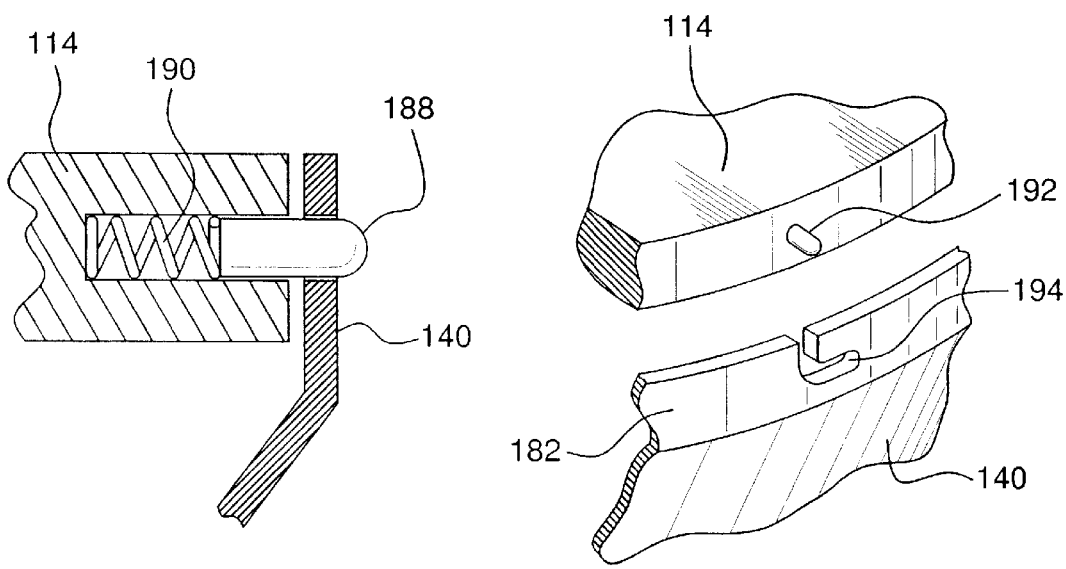
FIG. 6 is a fragmentary sectional view of an alternative form of a detail of the quick connect device shown in FIGS. 4 and 5.
FIG. 7 is a fragmentary perspective view of another alternative form of a detail of the quick connect device shown in FIGS. 4 and 5.

Referring to FIG. 6, instead of, or in addition to, the screws 186, the bell 140 may be secured to the mounting slide 114 by pins 188 located within the holes 172 and urged outwards by springs 190 to engage the holes 184. The spring pins 188 are quicker to engage than screws and, because they can be made captive within the holes 172, do not get lost. However, for some applications a fastening that cannot be removed without tools may be preferred. Referring to FIG. 7, instead of, or in addition to, the screws 186 or pins 188, the bell 140 may be secured to the mounting slide 114 by pins 192 projecting from the mounting slide 114 and engaging in L-shaped slots 194 in the rim 182 of the bell. The pins 192 and slots 194 are easier to align than the holes 172 and 184, but may be less secure, so it may be preferred to mount the bell 140 on the pins 192, and then fasten it with at least one screw 186.

The present invention may be embodied in still further specific forms without departing from the spirit or essential attributes thereof and, accordingly, reference should be made to the appended claims, rather than to the foregoing specification, as indicating the scope of the invention. In particular, although two distinct embodiments have been described and illustrated, it will be apparent to those skilled in the art how features from different embodiments may be combined and interchanged in various ways, only some of which have been specifically mentioned above.

For example, instead of the springs 58 shown in FIGS. 1 and 3, mechanical stops may be provided. It is only necessary that the hanging slide 15 be held above the bell 40 sufficiently firmly to allow it to be easily inserted into the mounting slide 14, but not so firmly that the bell 40 cannot then be tightened against the ceiling when installing and lowered away from the ceiling for disconnection.

For example, if the bell 40 is sufficiently wide compared with the length of the channels 14 and 15, the sliding connection may be carried out with the channels inside the lip of the bell. It is not then necessary for the hanging slide 15 to be raised entirely above the rim of the bell 40.

What is claimed is:

1. A quick connect device for suspended electrical devices, comprising:
   a first support member defining a channel, and having within it a first electrical connector;
   a second support member, dimensioned to slide along and be guided by the channel into a position mating with said first support member, and bearing a second electrical connector, said first and second connectors so positioned as to mate when the second support member is slid into mating position;
   said first support member being adapted to be attached to an electrical ceiling box, and said second support member being adapted to be attached to and support an electrical device.

2. A quick connect device according to claim 1, further comprising a bell adapted to be secured in a position covering said support members when said support members are in mating position and, when in that position, to prevent said support members from being separated.

3. A quick connect device according to claim 2, wherein said bell and at least one of said support members are provided with holes for at least one screw to retain said bell in said position covering said support members.

4. A quick connect device according to claim 2, wherein said bell is provided with at least one hole and at least one of said support members is provided with at least one resiliently biased pin positioned to engage said at least one hole and to retain said bell in said position covering said support members.

5. A quick connect device according to claim 2, wherein said bell is provided with at least one slot and at least one of said support members is provided with a pin to engage in said at least one slot to secure said bell in said position covering said support members.

6. A quick connect device according to claim 2, wherein said bell is connected to the said other support member by screws, and is raised into said position covering said support members by tightening said screws.

7. A quick connect device according to claim 1, wherein said second support member defines a second channel into which said first electrical connector projects when said support members are in mating position.

8. A quick connect device according to claim 1, wherein said one of said support members is said first support member.

9. A quick connect device according to claim 1, wherein said one of said support members is fixed to a cover plate adapted to be fastened to an electrical ceiling box.

10. A ceiling mountable electrical device, comprising:
    a first mounting member adapted to be attached to and project from a ceiling;
    a second mounting member attached to the device, one of the first and second members defining a channel into which the other can slide, said mounting members arranged to mate by horizontal sliding movement of the device and the second mounting member when the first mounting member is attached to a ceiling; and
    first and second electrical connectors on the first and second mounting members, positioned to be in the said channel and to mate when the first and second mounting members mate, the first electrical connector being adapted to be connected to an electrical supply in the ceiling and the second electrical connector being electrically connected to the device;
    whereby the device can be electrically and mechanically attached to the ceiling by a single horizontal sliding movement.

11. An electrical device according to claim 10, which is a device selected from the group consisting of lamps and fans.

12. An electrical device according to claim 10, further comprising a bell arranged to cover the mating mounting members and to prevent them from being separated.

13. An electrical device according to claim 10, wherein said first mounting member defines said channel.

14. An electrical device according to claim 10, wherein the other of said first and second mounting member defines another channel into which said electrical connector on said one mounting member projects.

15. An electrical device according to claim 10, wherein said first mounting member is fixed to a cover plate adapted to be fastened to an electrical ceiling box.

\* \* \* \* \*